3,081,349
CATALYSTS FOR CONDENSATION REACTIONS OF PRIMARY AMINES WITH DIHYDROXY AROMATIC COMPOUNDS
Ronald B. Spacht, Kent, Ohio, assignor to The Goodyear Tire & Rubber Company, Akron, Ohio, a corporation of Ohio
No Drawing. Filed July 25, 1958, Ser. No. 750,859
4 Claims. (Cl. 260—576)

This invention is concerned with condensation catalysts and a process for preparing various diamines. In particular, this invention is concerned with the use and removal of iron and halide catalysts in a process for condensing primary amines and hydroquinones.

Various metallic halides, such as aluminum chloride, titanium chloride, and ferric chloride, are known to catalyze the condensation of various amines and various phenols. Unfortunately, polyvalent metal halides as catalysts have not been found completely acceptable in the preparation of diamines which are to be used in rubber as antioxidants because the presence of polyvalent metals tends to catalyze the oxidation of the rubber and thus reduces the antioxidant properties of the antioxidants. Also, some of the metallic halides produce low yields due to by-product diphenyl amines and tars which result from complicated side reactions. Other catalysts of this group catalyze the condensation very slowly at low temperatures and require high temperatures and long periods of time. In addition, certain of these catalysts are very corrosive to metal reactors and thus greatly restrict their commercial use.

Also, free halogens such as iodine have been used as catalysts for condensing various amines and various phenols. Free halogens are not completely successful because of low yields, tarry products and side reactions with the amines used in the reactions.

It is an object of this invention to provide a catalyst system for condensing primary amines and polyhydroxy aromatic compounds. It is a further object of this invention to provide a process for condensing primary amines and polyhydroxy compounds which is characterized by the use of iron and free iodine as catalysts and their removal from the reaction products.

In the practice of this invention, aromatic diamines are prepared by condensing an amine with a polyhydroxy aromatic compound in the presence of metallic iron and iodine as the catalyst, the iron being thereafter removed by precipitating the same in the form of an insoluble iron salt.

More particularly, the invention is concerned with the process of preparing aromatic diamines comprising (1) preparing a mixture of at least one primary amine and at least one polyhydroxy aromatic compound, (2) adding to said mixture a catalytic amount of a mixture of metallic iron and free iodine as a catalyst and a liquid hydrocarbon capable of forming an azeotrope with water, (3) reacting said mixture while continuously removing the formed water in the form of an azeotrope with the liquid hydrocarbon, (4) removing the pressure and reducing the temperature and thereafter adding to the mixture a sufficient quantity of a water soluble salt to precipitate all of the iron in the form of an insoluble iron salt, (5) removing water and excess reactants, (6) filtering the mixture to remove the insoluble iron salts and (7) cooling and purifying the formed aromatic diamines.

The diamines which can be prepared by the practice of this invention may be described as diamines conforming to the following structural formula

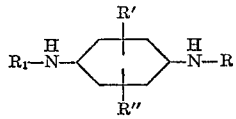

wherein R and $R_1$ may be the same or different primary or secondary alkyl radicals having from 1 to 20 carbon atoms, aralkyl radicals having from 7 to 12 carbon atoms, cycloalkyl radicals having from 5 to 8 carbon atoms, aryl radicals conforming to the following structure

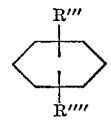

wherein $R'''$ and $R''''$ are hydrogen or the same or different primary or secondary alkyl radicals having from 1 to 20 carbon atoms, aralkyl radicals having from 7 to 12 carbon atoms, cycloalkyl radicals having from 5 to 8 carbon atoms or alkoxy radicals having from 1 to 9 carbon atoms, and wherein $R'$ and $R''$ may be hydrogen or primary or secondary alkyl radicals containing from 1 to 20 carbon atoms.

In preparing the diamines of this invention which are useful as antioxidants for rubber, the primary amines which may be condensed with the polyhydroxy aromatic compounds may be described as one or a mixture of aliphatic or aromatic primary amines which may be defined by the following structural formula $$R-NH_2$$

wherein R may be a primary or secondary alkyl radical containing from 1 to 20 carbon atoms, an aralkyl radical having from 7 to 12 carbon atoms, a cycloalkyl radical having from 5 to 8 carbon atoms, or an aryl radical conforming to the following structure

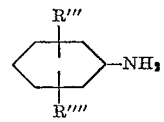

wherein $R'''$ and $R''''$ are hydrogen or the same or different primary or secondary alkyl radicals having from 1 to 20 carbon atoms, aralkyl radicals having from 7 to 12 carbon atoms, cycloalkyl radicals having from 5 to 8 carbon atoms or alkoxy radicals having from 1 to 9 carbon atoms.

The amines which conform to the above and which are useful in the practice of this invention are well-known in the art. Illustrative of the aliphatic amines are the primary and secondary butyl, octyl and nonyl amines, etc. Illustrative of the cycloaliphatic amines are cyclohexylamine, methyl cyclohexylamine, etc. Illustrative of the aromatic amines are aniline, o-toluidine, 2,4-xylidine, o-anisidine, p-anisidine, etc.

The polyhydroxy aromatic compounds are preferably hydroquinones such as hydroquinone or substituted hydroquinones wherein the substitution is one or more alkyl radicals containing from 1 to 20 carbon atoms. Corresponding resorcinols and catechols are non-fully equivalent polyhydroxy aromatic compounds which can be used in the practice of this invention.

It has been discovered that free iron plus free iodine is particularly effective as a catalyst for the condensation of primary amines and polyhydroxy aromatic compounds. The iron is customarily powdered and the iodine in the free state.

The catalyst may be present in customary catalytic amounts. For example, from 3 to 12 parts of iodine per part of iron powder or iron filings may be used as a catalyst. From 3 to 20 grams of such a mixture may be used per mol of hydroquinone. The iron and iodine may be added individually to the mixture of hydroquinone and amines or they may be mixed before and then added to the mixture of amine and hydroquinone. Preferred quantities of catalyst are 1 gram of iron to 6.25 grams of iodine to 2 grams of iron to 12.5 grams of iodine per mol of hydroquinone.

Although not absolutely necessary in the practice of the invention, it is preferable to add a compound capable of forming an azeotrope with water to the reaction mixture. This compound may also be used as a carrier for the catalyst, if desired, although this is not necessary in practicing the invention. These compounds may be well known liquid hydrocarbons which are capable of forming azeotropes with water which is formed in the condensation reaction. For example, toluene, benzene, xylene, etc., may be used for this purpose.

Customary reaction conditions may be used in condensing the primary amines with the polyhydroxy aromatic compounds and will, of course, depend on the reactants being used in preparing the aromatic diamines. The process is customarily practiced in a pressure system which normally ranges between 100 and 150 p.s.i. although it may be practiced at pressures ranging from atmospheric pressure to 20 atmospheres of pressure. The temperature of the reaction will customarily be between 250° C. and 275° C. although temperatures between 220° C. and 320° C. may be used and temperatures between 100° C. and 350° C. are effective in the practice of the invention. The time required for completion of the condensation will, of course, depend upon the temperature, pressure and reactants. Normally, the reaction is completed in a period of 4 to 6 hours although the time may range from a few minutes to as much as 20 hours.

The concentration of primary amines in the condensation reaction will customarily range from about 2 to 3 mols of amine per mol of polyhydroxy compound. Since a slight excess of amine over the theoretical proportions of dihydroxy compounds is desired, about 2.25 mols of amine per mol of polyhydroxy compound is customarily used. The amines and polyhydroxy compounds may be pure compounds or may be mixtures of the respective amines and polyhydroxy compounds.

The invention is further characterized by the following examples which are not intended as limitations on the scope of the invention. The following laboratory experiments were made at atmospheric pressure in a batching vessel designed for the continuous removal of the water of condensation. This was accomplished by using an air condenser which was connected to a downward water-cooled condenser. The temperature of the reaction was controlled so that very little amine distilled from the reaction vessel. The water of condensation was collected in a graduate containing 100 millimeters of toluene. The reaction was followed by the amount of water collected in the graduate. Thereafter, the reaction mixture was cooled to about 150° C. and the diamines were purified.

EXAMPLE 1

Two hundred and twenty grams of hydroquinone, 125 grams of aniline, 4 grams of iron powder and 25 grams of iodine were added to a flask. The reaction vessel was heated to a temperature of about 180° C. and the temperature was gradually raised to about 240° C. Then 325 grams of additional aniline were added slowly at this temperature until no more water of condensation came out of the reaction vessel. After digestion for ½ hour, the volatiles were removed by heating the reacted mixtures to 260° C. at 8 millimeters of pressure. Tests indicated that the diamine yield was 481 grams of product having a melting point of 132–138° C. which would be about 92 percent of the theoretical yield.

EXAMPLE 2

The process of Example 1 was repeated except that the catalyst was comprised of 2 grams of iron powder and 12.5 grams of iodine.

Using hydroquinone as one reactant, similar experiments have been made wherein the amines used in the reaction were mono and di amyl aniline and mono and di dodecyl aniline. Also similar experiments have been made using ortho toluidine and para anisidine as the amine reactants. In addition, similar experiments have been made wherein mixtures of amines have been used. For example, various mixtures of aniline and o-toluidine and various mixtures of aniline and cyclohexylamine have been used.

As indicated, the presence of iron in an antioxidant is very undesirable. It has further been discovered that the undesirable iron may be removed by adding a water soluble salt which is capable of providing an insoluble iron salt to the reaction mixture after the condensation is complete but before the diamines have been purified. The various alkali metal salts which are soluble in water may be used for this purpose. For example, the carbonates, hydroxides, phosphates, sulfides, sulfites, etc., of monovalent metals such as sodium, potassium, lithium, etc. may be used for this purpose. Also, the corresponding ammonium salts may also be used. Ammonia is used herein as an alkali metal. The preferred compound is sodium carbonate because it readily reacts with the iron to form insoluble iron compounds and soluble sodium halide, each of which is easily removed from the reaction mixture during the purification process.

Each of the above experiments produced the corresponding diamines in almost theoretical yield in reasonably short periods of time.

The catalytic superiority of mixtures of iron and iodine over iron alone or iodine alone is shown in Table I wherein the experiments were conducted as described in Example 1.

*Table I*

COMBINATIONS OF CATALYSTS

| Catalysts | Quantity/Mole Hydroquinone in Grams | 50% H₂O Time, mins. | 50% H₂O Temp. | 100% H₂O Time, hrs. | 100% H₂O Temp. | Yield Gms. | Percent Yield | Melting Point, °C. |
|---|---|---|---|---|---|---|---|---|
| Fe / I₂ | 2 / 12.5 | 10 | 223 | 2 | 250 | 489 | 94 | 135–139 |
| Fe / I₂ | 1 / 6.25 | 15 | 238 | 4 | 251 | 469 | 90 | 137–140 |
| I₂ / Fe | 12.5 | 30 | 240 | 4 / No reaction | 248 | 388 | 75 | (¹) |

¹ Failed to crystallize.

Thus, the mixtures of iron and iodine used in the process described herein are unexpectedly superior catalysts for reacting hydroquinones with primary amines because (1) lower reaction temperatures may be used, (2) reactions are faster, (3) less tarry by-products result, (4) less diphenylamine is produced, and (5) a substantial increase in diamine content is made possible. The catalysts described herein, coupled with the removal of iron from the formed diamines, provide unexpectedly superior antioxidants for oxidizable materials such as rubber.

While certain representative embodiments and details have been shown for the purpose of illustrating the invention, it will be apparent to those skilled in this art that various changes and modifications may be made therein without departing from the spirit or scope of the invention.

I claim:
1. In the process of preparing aromatic diamines comprising reacting (1) from two to three mols of a primary amine having the following formula

$$R-NH_2$$

wherein R is selected from the group consisting of primary alkyl radicals containing from 1 to 20 carbon atoms, secondary alkyl radical containing from 1 to 20 carbon atoms, cycloalkyl radical containing from 5 to 8 carbon atoms and aryl radical conforming to the following structure

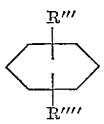

wherein R''' and R'''' are selected from the group consisting of hydrogen, primary alkyl radicals containing from 1 to 20 carbon atoms and alkoxy radicals containing from 1 to 9 carbon atoms, with (2) one mol of a dihydroxy aromatic compound selected from the group consisting of hydroquinone, resorcinol and catechol at a temperature between 100 and 350° C. the improvement wherein the reaction is conducted in the presence of a liquid hydrocarbon capable of forming an azeotrope with water selected from the group consisting of toluene, benzene and xylene, and in the presence of a catalytic amount of a mixture of free iodine and free iron in powdered form, said mixture being composed of from 3 to 12 parts of iodine per part of iron.

2. A process according to claim 1 wherein the liquid hydrocarbon capable of forming an azeotrope with water is toluene.

3. In the process of preparing aromatic diamines comprising reacting (1) from two to three mols of a primary amine having the following formula $$R-NH_2$$

wherein R is selected from the group consisting of primary alkyl radicals containing from 1 to 20 carbon atoms, secondary alkyl radical containing from 1 to 20 carbon atoms, cycloalkyl radical containing from 5 to 8 carbon atoms and aryl radical conforming to the following structure

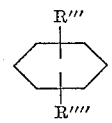

wherein R''' and R'''' are selected from the group consisting of hydrogen, primary alkyl radicals containing from 1 to 20 carbon atoms and alkoxy radicals containing from 1 to 9 carbon atoms, with (2) one mol of a dihydroxy aromatic compound selected from the group consisting of hydroquinone, resorcinol and catechol at a temperature between 100 and 350° C. the improvement wherein the reaction is conducted in the presence of a catalytic amount of a mixture of free iodine and free iron in powdered form, said mixture being composed of from 3 to 12 parts of iodine per part of iron.

4. A process according to claim 3 wherein the mixture is composed of iron filings and free iodine.

References Cited in the file of this patent
UNITED STATES PATENTS

| | | |
|---|---|---|
| 2,041,782 | Semon | May 26, 1936 |
| 2,087,199 | Clifford | July 13, 1937 |
| 2,111,863 | Levine | Mar. 22, 1938 |
| 2,200,747 | Howland | May 14, 1940 |
| 2,824,137 | Morris | Feb. 18, 1958 |

FOREIGN PATENTS

| | | |
|---|---|---|
| 611,316 | Great Britain | Oct. 28, 1948 |